E. J. CADY.
PAPER SCALE.
APPLICATION FILED MAR. 10, 1919.
1,321,595.
Patented Nov. 11, 1919.
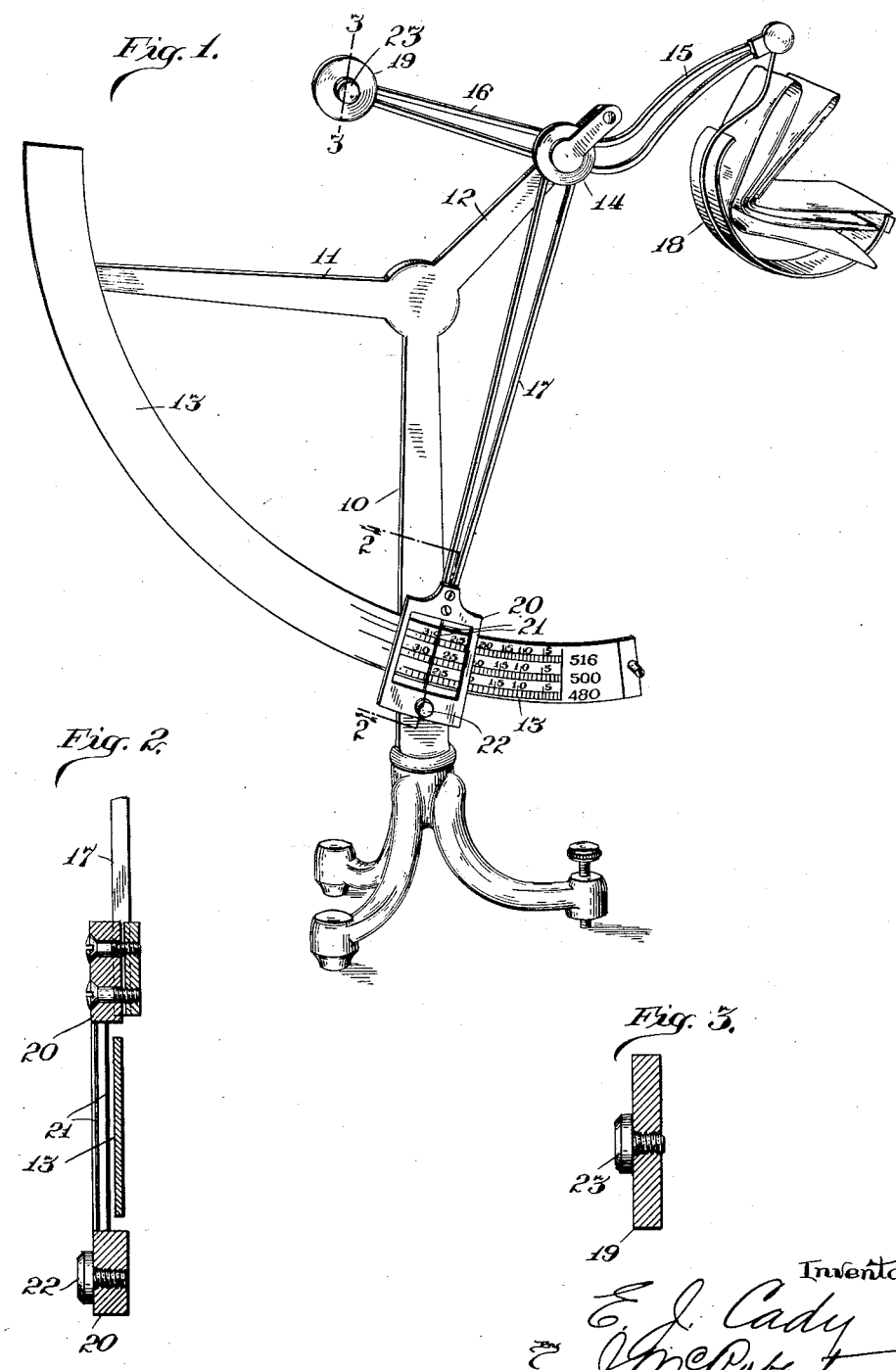

UNITED STATES PATENT OFFICE.

ELISHA J. CADY, OF OAK PARK, ILLINOIS.

PAPER-SCALE.

1,321,595.   Specification of Letters Patent.   Patented Nov. 11, 1919.

Application filed March 10, 1919. Serial No. 281,797.

*To all whom it may concern:*

Be it known that I, ELISHA J. CADY, citizen of the United States, residing at Oak Park, in the county of Cook and State of Illinois, have invented certain new and useful Improvements in Paper-Scales, of which the following is a specification, reference being had therein to the accompanying drawing.

My invention relates to paper scales and consists in structural features whereby the adjustment of the device may be more readily and accurately made, and any inaccuracies in that respect more easily corrected.

In the accompanying drawings Figure 1 is a front view of the device with a sheet of paper in the scoop or basket;

Fig. 2 is a sectional view on the line 2—2 of Fig. 1, and

Fig. 3 is a similar view on the line 3—3.

In the drawings 10 represents a standard having the opposite lateral wings 11 and 12, and 13 represents the scale sector or dial which is attached to the standard 10 and which is attached to the standard 10 and wing 11 on the arc of a circle having its center at a point located near the end of the wing 12 where the supporting disk 14 of the combined indicating and suspending beam is pivoted, all as shown in Fig. 1. The beam comprises the pivotally mounted disk 14 and the three arms 15, 16 and 17, secured to this disk in fixed relation as shown, the arm 15 forming the suspender for carrying the scoop or basket 18 for the paper sample to be weighed, the second arm 16 carrying the counterweight 19, and the third arm 17 forming the pendulum and carrying the indicator in position in front of the dial. Each of these arms is of open or bridge construction composed of a pair of light steel rods or strips of predetermined and uniform density and weight having their ends united. The indicator fixed to the lower end of arm 17 comprises an open rectangular frame 20 carrying a pair of wires 21 arranged in parallelism in a plane transverse to the dial 13 and passing through the pivot of the disk 14. The arms are made by cutting these rods or strips into suitable lengths, and as they are all thus made from material of uniform density and weight they are uniformly standardized. Hence, as the basket 18 and weight 19 with their respective attaching means are made to approximately counterbalance each other, the normal equilibrium of the beam to bring the pointer of the pendulum at the zero mark on the dial in vertical alinement with the pivot of the beam can be obtained by cutting the arms 15 and 16 to the required predetermined lengths.

In order to take up any slight differences that may occur in the counterpoise of the beam from variations in the weight of the baskets or other causes, I provide removable and replaceable buttons or weights. For this purpose the frame 20 is tapped in its lower portion to receive the threaded shank of a weight 22, and the counterweight 19 is tapped to receive the threaded shank of a weight 23. These weights are small disks or buttons that may be readily removed and altered and replaced in order to establish equilibrium or counterpoise of the parts so that the pointer will stand at the zero mark on the dial when the receptacle 18 is empty.

In paper scales of this general type as heretofore constructed the several arms of the beams were usually made of cast metal and were integral, and in order to secure the normal equilibrium of the parts with the pointer at zero on the dial it was necessary owing to the variations inherent in cast metal to alter the weight of one or more of the arms as by dressing it down; as extreme nicety of adjustment is necessary in order to secure perfect equilibrium and to accurately indicate the minute variations in measurement of paper stocks differing very slightly in weight, it was difficult to alter the arms to the exact amount necessary to secure equipoise and frequently the alterations resulted in spoiling the entire element. By my invention the equipoise of the beam is usually attained by the predetermined counterbalancing of the standardized arms 15 and 16, and when any variations in the beam occur it is possible to correct them by merely altering the buttons or weights, which also can be done to extreme nicety and accuracy, and even if alteration of several buttons is required the loss involved is limited to the buttons thus spoiled and does not extend to any of the major elements of the beam. The receptacle 18 and counterweight 19 with their arms ordinarily will balance so that when not in use the pointer will be at the zero mark on the dial, and by the nicety of adjustment afforded by the small weights or buttons any differences in weight of the baskets can be adjusted and the pointer brought into exact alinement with the initial indicating mark on the dial without disturbing or altering any other parts. If the adjustment required is slight the weight in the pointer frame may be merely dressed down at one side or the other; if the adjustment is considerable, the weight 23 may be changed accordingly. Any suitable manner or method of varying the weights may be employed.

Further, the sensitiveness of the beam is increased by the open or bridge construction of its arms, as the decrease in weight of the beam thereby obtained in comparison with the heavier beams employed decreases the frictional resistance at its pivot, and this construction gives rigidity to the arms as it prevents their vibrations and preserves the relation of their ends, and also affords economy of construction in providing rigid arms by using the minimum of material.

The dial 13 carries a plurality of scales, each giving the weight in pounds of a ream of paper stock of the count indicated by the scale; in the present instance three scales are numbered 480, 500 and 516, and respectively having graduations corresponding with the ordinary United States and English count of 480 sheets to the ream, with the metric system count of 500 sheets to the ream, and with the so-called printer's count of 516 sheets to the ream which thus allows for sheets spoiled in printing, and so they give the weight in pounds of the number of sheets of uniform size with a sample placed in the basket 18 making a ream of 480, 500 or 516 count respectively. For weighing box-board, a sample of the stock, say 12x12 inches, is placed in the scoop, and the pointer automatically registers the weight of 500 square feet of the stock, and of course double this weight is the weight for a thousand square feet of this stock.

I claim:—

1. In a paper scale, a standard having a beam-carrying arm and a curved dial having a scale indicating the weight of reams of paper stock, and a beam pivoted to the arm at the center of curvature of the dial and comprising a pendulum-arm, a basket-supporting arm and a counterweight arm, the two latter arms being composed of pairs of strips cut to predetermined length from a metallic body of uniform weight to balance the pointer at the zero mark on the dial.

2. In a paper scale, a standard having a beam-carrying arm and a curved dial having a scale indicating the weight of reams of paper stock, and a beam pivoted to the arm at the center of curvature of the dial and comprising a pendulum-arm, a basket-supporting arm and a counterweight arm, the arms being composed of pairs of strips cut to predetermined length from a metallic body of uniform weight.

In testimony whereof I affix my signature in presence of two witnesses.

ELISHA J. CADY.

Witnesses:
BERNICE GORMLEY,
J. McROBERTS.